UNITED STATES PATENT OFFICE 2,653,157 p-AMINO-SALICYLIC ACID DERIVATIVES AND THEIR PRODUCTION

Rudolf Albert Ursprung, Aarburg, Switzerland, assignor to Aktiengesellschaft vormals B. Siegfried, Zofingen, Switzerland No Drawing. Application June 28, 1950, Serial No. 170,964. In Switzerland July 6, 1949

12 Claims. (Cl. 260—404)

This invention relates to new p-amino-salicylic acid derivatives and processes for making the same and particularly to 4-acylamino-2-hydroxy-1-benzoic acids and salts or esters thereof wherein the acylamino radical contains a group selected from the list consisting of the cyclopentenyl group and the cyclopentyl group.

Said compounds may be represented by the following general formula:

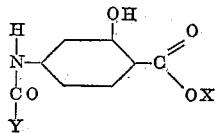

wherein X is a member selected from the group consisting of hydrogen, metal and alkyl and Y a radical containing a group selected from cyclopentyl and cyclopentenyl.

The metal is preferably an alkali metal and the alkyl a methyl, ethyl, propyl, butyl and the like.

I have found that compounds with valuable therapeutic properties are obtained if p-aminosalicylic acid or its salts or esters are reacted with acylating agents as acid halides or acid anhydrides containing a group selected from the list consisting of the cyclopentenyl and cyclopentyl group. This result is very surprising, for in the literature it is stated that a substitution in the 4-amino group, for example by aliphatic acids reduces the bacteriostatic effect. (The Lancet 1946, page 15.)

A further object of the invention is the preparation of said salicylic acid derivatives by reacting 4-amino-2-hydroxy-1-benzoic acid (p-aminosalicylic acid) or a salt or ester thereof with an acid halide or acid anhydride containing a cyclopentyl or cyclopentenyl radical.

*Example 1*

121 gms. p-amino-salicylic acid are mixed at normal temperature with 114.5 gms. cyclopentenyl-acetyl-chloride in the presence of dimethylaniline, whereby the temperature rises to about 30° C. After several hours standing the reaction product is dissolved in an aqueous solution of sodium carbonate, the solution washed by shaking with ether and the 4-cyclopentenyl-acetyl-amino-2-hydroxy-1-benzoic acid is precipitated by acidifying with hydrochloric acid. After having been again dissolved in soda solution and precipitated with hydrochloric acid, the product is recrystallised from diluted ethyl alcohol and the white crystalline mass obtained is then dried in a desiccator. The pure product melts at 205° C. with decomposition.

*Example 2*

To a solution of 85 gms. p-aminosalicylic acid and 150 gms. dimethylaniline in 1000 ml. ether are added 166 g. gynocardic acid chloride. When the reaction has gone to completion the mixture is extracted with soda solution and the reaction product is precipitated by addition of hydrochloric acid. After filtering by means of suction, drying under reduced pressure and recrystallisation from alcohol the 4-gynocardylamino-2-hydroxy-1-benzoic acid melts at 217-219° C. (with decompositon).

*Example 3*

By using Δ 2,3-cyclopentenyl-ethyl-acetylchloride in the same manner as in the foregoing examples one obtains the 4-cyclopentenylbutyryl-amino-2-hydroxy-1-benzoic acid, which after recrystallization from dilute alcohol will be found to melt at 169° C. with decomposition.

What I claim is:

1. A new p-amino-salicylic acid compound having the following formula

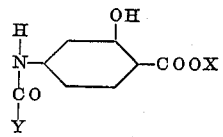

in which X is a member of the group consisting of hydrogen, a non-toxic metal and a lower alkyl and Y is a hydrocarbon radical composed of a chain of 1 to 12 carbon atoms terminating in a member selected from the group consisting of the cyclopentyl- and cyclopentenyl radicals.

2. 4-cyclopentenyl-acetylamino - 2 - hydroxy-1-benzoic acid.

3. 4-gynocardylamino-2-hydroxy - 1 - benzoic acid.

4. 4 - cyclopentenyl-butyryl-amino-2-hydroxy-1-benzoic acid.

5. In a process for preparing compounds of the formula

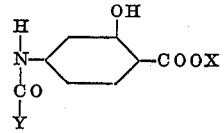

in which X is a member of the group consisting of hydrogen, a non-toxic metal and a lower alkyl and Y is a hydrocarbon radical composed of a chain of 1 to 12 carbon atoms terminating in a member selected from the group consisting of the cyclopentyl- and cyclopentenyl radicals, the step of reacting a compound selected from the group consisting of p-amino-salicylic acid, its non-toxic salts and lower alkyl esters with an acylating agent giving the radical Y—CO, wherein Y is a hydrocarbon radical composed of a chain of 1 to 12 carbon atoms terminating in a member selected from the group consisting of the cyclopentyl- and cyclopentenyl radicals.

6. In a process for preparing compounds of the formula

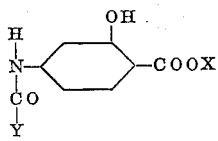

in which X is a member of the group consisting of hydrogen, a non-toxic metal and a lower alkyl and Y is a hydrocarbon radical composed of a chain of 1 to 12 carbon atoms terminating in a member selected from the group consisting of the cyclopentyl- and cyclopentenyl radicals, the step of reacting a compound selected from the group consisting of p-amino-salicylic acid, its non-toxic salts and lower alkyl esters with an acid halide the hydrocarbon radical of which is composed of a chain of 1 to 12 carbon atoms terminating in a member selected from the group consisting of the cyclopentyl and cyclopentenyl radicals.

7. In a process for preparing compounds of the formula

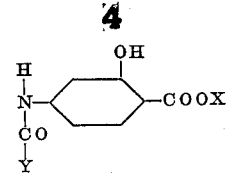

in which X is a member of the group consisting of hydrogen, a non-toxic metal and a lower alkyl and Y is a hydrocarbon radical composed of a chain of 1 to 12 carbon atoms terminating in a member selected from the group consisting of the cyclopentyl- and cyclopentenyl radicals, the step of reacting a compound selected from the group consisting of p-amino-salicylic acid, its non-toxic salts and lower alkyl esters with an acid anhydride, the hydrocarbon radical of which is composed of a chain of 1 to 12 carbon atoms terminating in a member selected from the group consisting of the cyclopentyl and cyclopentenyl radicals.

8. A non-toxic salt of 4-cyclopentenyl-acetyl-amino-2-hydroxy-1-benzoic acid.

9. A non-toxic salt of 4-gynocardylamino-2-hydroxy-1-benzoic acid.

10. A non-toxic salt of 4-cyclopentenyl-butyryl-amino-2-hydroxy-1-benzoic acid.

11. A lower alkyl ester of 4-cyclopentenyl-acetylamino-2-hydroxy-1-benzoic acid.

12. A lower alkyl ester of 4-cyclopentenyl-butyryl-amino-2-hydroxy-1-benzoic acid

RUDOLF ALBERT URSPRUNG.

No references cited.